US010156947B2

(12) United States Patent
Jiang et al.

(10) Patent No.: US 10,156,947 B2
(45) Date of Patent: Dec. 18, 2018

(54) TOUCH SUBSTRATE AND MANUFACTURING METHOD AND DRIVING METHOD THEREOF, TOUCH PANEL AND TOUCH DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Liangliang Jiang, Beijing (CN); Ruiying Yang, Beijing (CN); Yongjun Yoon, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/159,339

(22) Filed: May 19, 2016

(65) Prior Publication Data

US 2017/0083130 A1 Mar. 23, 2017

(30) Foreign Application Priority Data

Sep. 17, 2015 (CN) .......................... 2015 1 0595256

(51) Int. Cl.
*G06F 3/041* (2006.01)
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
None
See application file for complete search history.

(56) References Cited

U.S. PATENT DOCUMENTS 9,214,290 B2 12/2015 Xie et al.
2002/0133310 A1* 9/2002 Tamura ................... G01L 1/205
702/139

(Continued)

FOREIGN PATENT DOCUMENTS

CN 103425301 A 12/2013

OTHER PUBLICATIONS

First Office Action dated Aug. 9, 2017 in corresponding Chinese Patent Application No. 201510595256.6.

*Primary Examiner* — Carl Adams
(74) *Attorney, Agent, or Firm* — Nath, Goldberg & Meyer; Joshua B. Goldberg

(57) ABSTRACT

The present invention provides a touch substrate and a manufacturing method and a driving method thereof, a touch panel and a touch device. The touch substrate comprises: a base substrate, and an electrode layer, a bridging portion and a sensor provided above the base substrate, the electrode layer comprises a plurality of first electrodes and a plurality of second electrodes, the first electrode and the second electrode are provided intersecting with each other, the sensor corresponds to intersection position of the first electrode and the second electrode, and is connected to the first electrode and the second electrode respectively, wherein the sensor is configured to generate a piezoelectric signal when a touch occurs, and the electrode layer is configured to transmit the piezoelectric signal for the touch substrate sensing position of touch point.

17 Claims, 2 Drawing Sheets

(56) References Cited

U.S. PATENT DOCUMENTS

| | | | |
|---|---|---|---|
| 2009/0195516 A1 | 8/2009 | Kuo et al. | |
| 2009/0309843 A1* | 12/2009 | Kim | G06F 3/0414 345/173 |
| 2010/0156819 A1* | 6/2010 | Takahashi | G06F 3/0412 345/173 |
| 2011/0087990 A1* | 4/2011 | Ng | G06F 3/04886 715/773 |
| 2013/0076687 A1* | 3/2013 | Giddings | G06F 3/0412 345/174 |
| 2013/0306452 A1* | 11/2013 | Xie | H01H 1/64 200/304 |
| 2015/0145826 A1* | 5/2015 | Lee | G06F 3/044 345/174 |
| 2016/0195971 A1* | 7/2016 | Ando | G06F 3/044 345/174 |

* cited by examiner

TOUCH SUBSTRATE AND MANUFACTURING METHOD AND DRIVING METHOD THEREOF, TOUCH PANEL AND TOUCH DEVICE

FIELD OF THE INVENTION

The present invention relates to the field of touch technology, and specifically relates to a touch substrate, a manufacturing method and a driving method of the touch substrate, a touch panel and a touch device.

BACKGROUND OF THE INVENTION

Currently, touch panels in the market are mainly divided into capacitive touch panels and resistive touch panels. A capacitive touch panel comprises an array substrate, a color filter substrate and a touch substrate, referring to FIGS. 1 and 2, a touch substrate of prior art comprises a base substrate 10, a drive sensing electrode layer 20, a protective layer 30 and a metal layer 40, wherein the drive sensing electrode layer 20 comprises a sensing electrode 201 and a driving electrode 202, and a glass cover (not shown in the figures) is also provided above the metal layer 40. When a user touches the touch substrate by a finger, under action of electric field of human body, coupling capacitances will be generated between the finger and the sensing electrode 201 and the driving electrode 202, based on varies of the capacitances generated at the touch point by the sensing electrode 201 and the driving electrode 202, position of the touch point can be calculated accurately.

However, at least following problems exist in the prior art: when the finger of the user wears a glove or other insulation medium to touch the touch substrate, no coupling capacitance will be generated between the finger and the sensing electrode and the driving electrode, thus touch function of the touch substrate cannot be triggered.

SUMMARY OF THE INVENTION

An object of the present invention is, in view of the problem that touch function of the touch substrate cannot be triggered when no coupling capacitance is generated between the finger and the sensing electrode and the driving electrode, to provide a touch substrate which can perform touch function even when no coupling capacitance is generated between the finger and the sensing electrode and the driving electrode.

In order to achieve above object, a technical solution adopted by the present invention is a touch substrate, comprising: a base substrate, and an electrode layer, a bridging portion and a sensor provided above the base substrate, the electrode layer comprises a plurality of first electrodes and a plurality of second electrodes, the first electrode and the second electrode are provided intersecting with each other, the sensor corresponds to intersection position of the first electrode and the second electrode, and is connected to the first electrode and the second electrode respectively, wherein the sensor is configured to generate a piezoelectric signal when a touch occurs, and the electrode layer is configured to transmit the piezoelectric signal for the touch substrate sensing position of touch point.

The touch substrate may further comprise a sensing chip connected to the electrode layer for the touch substrate sensing position of touch point.

The touch substrate may further comprise a protective layer provided between the electrode layer and the bridging portion.

The bridging portion may be configured to bridge the first electrode or the second electrode.

The sensor may be connected to the bridging portion.

The sensor may have a thickness ranging from 0.01 μm to 0.1 μm.

The sensor may have an area ranging from $10^2$ μm$^2$ to $100^2$ μm$^2$.

The sensor may be formed of one of ZnO, SnO$_2$, In$_2$O$_3$, IZO, ZTO, IGO, IGZO, ZITO, AZTO, GZTO, HIZO.

The sensor may have a sheet-like shape.

As another implementation, the present invention provides a manufacturing method of a touch substrate, and the touch substrate is any one of above touch substrates, the manufacturing method comprising steps of:

forming a base substrate; and forming an electrode layer, a bridging portion and a sensor above the base substrate;

wherein the electrode layer comprises a plurality of first electrodes and a plurality of second electrodes, the first electrode and the second electrode are provided intersecting with each other, the sensor corresponds to intersection position of the first electrode and the second electrode, and is connected to the first electrode and the second electrode respectively.

The manufacturing method of the touch substrate may further comprise a step of: forming a protective layer between the electrode layer and the bridging portion.

The bridging portion may be configured to bridge the first electrode or the second electrode.

The sensor may be connected to the bridging portion.

As another implementation, the present invention provides a driving method of a touch substrate, and the touch substrate is any one of above touch substrates, the driving method comprising steps of:

generating a piezoelectric signal when the sensor is deformed by a touch; and transmitting the piezoelectric signal by the electrode layer for the touch substrate sensing position of touch point.

As another implementation, the present invention provides a touch panel, comprising an array substrate, a color filter substrate and a touch substrate, the touch substrate is any one of above touch substrates.

As another implementation, the present invention provides a touch device, comprising above touch panel.

A sensor is provided in the touch substrate of the present invention and the touch substrate involved in the manufacturing method and the driving method thereof, the touch panel and the touch device of the present invention, when a touch occurs, a piezoelectric signal can be generated from the sensor and is transmitted by the electrode layer for the touch substrate sensing position of touch point, the position of the touch point is determined without need of coupling capacitance to be formed between the finger and the sensing electrode and the driving electrode, even if the finger of the user wears a glove or other insulation medium to touch the touch substrate, the position of the touch point still can be determined accurately.

Specifically, when the sensor is deformed by action of external force, a polarization phenomenon occurs therein, and simultaneously, positive and negative charges are respectively generated on two opposite surfaces thereof. When the external force disappears, the sensor is restored to the state of non-charged. That is to say, when a user touches the surface of the touch substrate by a finger, the sensor is subjected to a vertical pressure and is bent in a direction perpendicular to a horizontal direction, and due to piezoelectric effect, a piezoelectric signal is generated between the two opposite surfaces of the sensor, the piezoelectric signal is positioned by the first electrode and the second electrode intersected with each other, and a corresponding touch response is generated.

REFERENCE NUMERALS

10: base substrate; 20: driving sensing electrode layer; 201: sensing electrode; 202: driving electrode; 30: protective layer; 40: metal layer; 1: base substrate; 2: electrode layer; 21: first electrode; 22: second electrode; 3: protective layer; 4: sensor; and 5: bridging portion.

DESCRIPTION OF THE PREFERRED EMBODIMENT

In order to make persons skilled in the art better understand technical solutions of the present invention, the present invention will be described in detail below in conjunction with the accompanying drawings and specific embodiments.

First Embodiment

The present embodiment provides a touch substrate, comprising: a base substrate, and an electrode layer, a bridging portion and a sensor provided above the base substrate, the electrode layer comprises a plurality of first electrodes and a plurality of second electrodes, the first electrode and the second electrode are provided intersecting with each other, the sensor corresponds to intersection position of the first electrode and the second electrode, and is connected to the first electrode and the second electrode respectively, wherein the sensor is configured to generate a piezoelectric signal when a touch occurs, and the electrode layer is configured to transmit the piezoelectric signal for the touch substrate sensing position of touch point.

Of course, a glass cover is further provided above the sensor to protect the touch substrate, but the transmittance of the touch substrate is not affected.

When the sensor is deformed by action of external force, a polarization phenomenon occurs therein, and simultaneously, positive and negative charges are respectively generated on two opposite surfaces thereof. When the external force disappears, the sensor is restored to the state of non-charged. That is to say, when a user touches the surface of the touch substrate by a finger, the sensor is subjected to a vertical pressure and is bent in a direction perpendicular to a horizontal direction, and due to piezoelectric effect, a piezoelectric signal is generated between the two opposite surfaces of the sensor, the piezoelectric signal is positioned by the first electrode and the second electrode intersected with each other, and a corresponding touch response is generated.

A sensor is provided in the touch substrate of the present invention, when a touch occurs, a piezoelectric signal can generated from the sensor and is transmitted by the electrode layer for the touch substrate sensing position of touch point, the position of the touch point is determined without need of coupling capacitance to be formed between the finger and the sensing electrode and the driving electrode, even if the finger of the user wears a glove or other insulation medium to touch the touch substrate, the position of the touch point still can be determined accurately.

Second Embodiment

Figure 1:
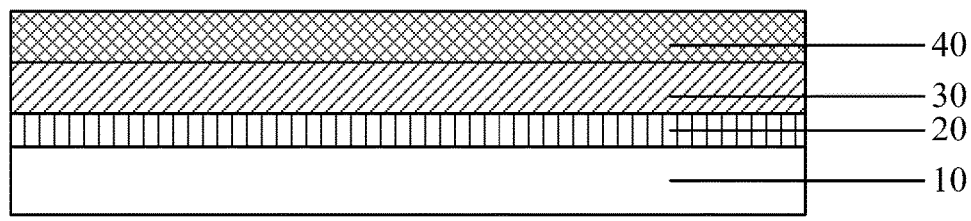
FIG. 1 is a structure diagram of a touch substrate in the prior art.
Figure 2:
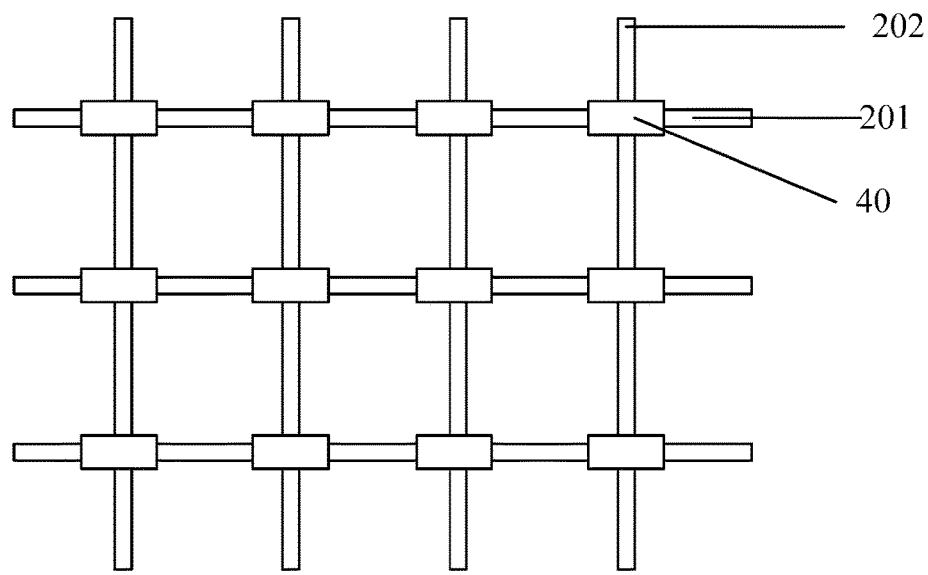
FIG. 2 shows a top view of structure of the touch substrate in the prior art.
Figure 3:
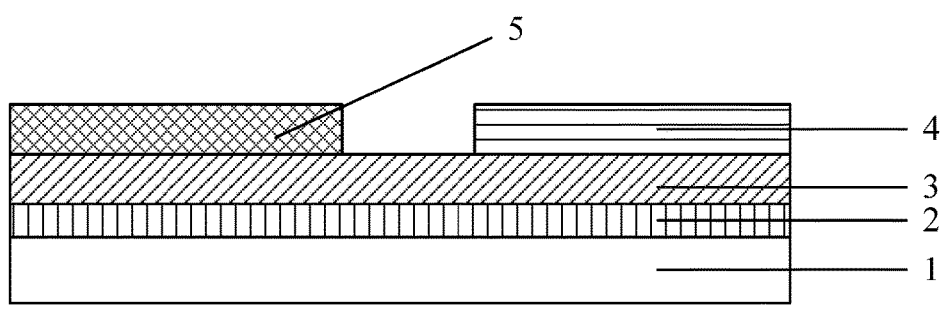
FIG. 3 shows a structure diagram of a touch substrate in a second embodiment of the present invention.
Figure 4:
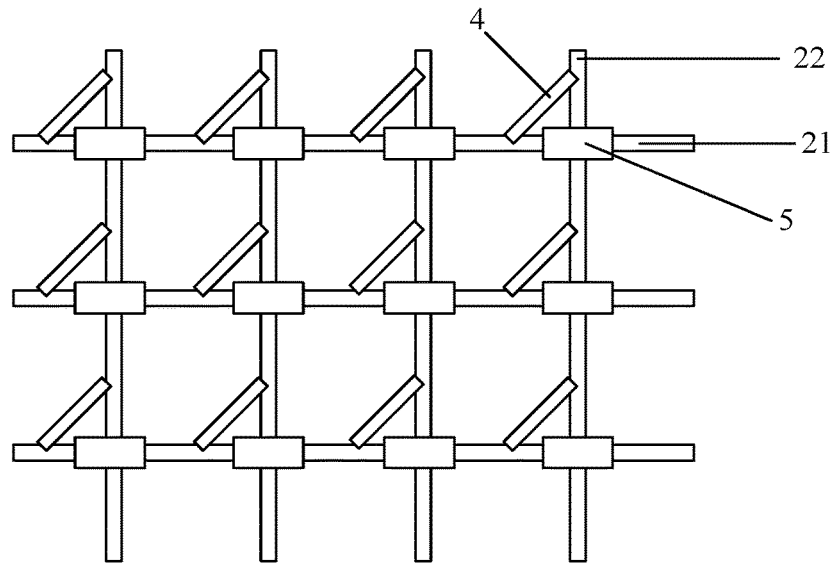
FIG. 4 shows a top view of structure of the touch substrate in the second embodiment of the present invention.

Referring to FIGS. 3 and 4, the present embodiment provides a touch substrate, comprising: a base substrate 1, and an electrode layer 2, a bridging portion 5 and a sensor 4 provided above the base substrate 1, the electrode layer 2 comprises a plurality of first electrodes 21 and a plurality of second electrodes 22, the first electrode 21 and the second electrode 22 are provided intersecting with each other, the sensor 4 corresponds to intersection position of the first electrode 21 and the second electrode 22, and is connected to the first electrode 21 and the second electrode 22 respectively, wherein the sensor 4 is configured to generate a piezoelectric signal when a touch occurs, and the electrode layer 2 is configured to transmit the piezoelectric signal for the touch substrate sensing position of touch point.

In the present embodiment, the touch substrate further comprises a sensing chip (not shown in the figures), the sensing chip is connected to the electrode layer for the touch substrate sensing position of touch point.

Of course, the present invention is not limited thereto, and the position of the touch point may also be sensed by other structures in accordance with the piezoelectric signal, which will not be described in detail herein.

In the present embodiment, the touch substrate further comprises a protective layer 3 provided between the electrode layer 2 and the bridging portion 5 so that the electrode layer 2 and the bridging portion 5 are separated from each other, because both the electrode layer 2 and the bridging portion 5 are formed of conductive material. Of course, since the bridging portion 5 only corresponds to intersection position of the first electrode 21 and the second electrode 22, the protective layer 3 may be provided only corresponding to intersection position of the first electrode 21 and the second electrode 22. It is conceivable that, the protective layer 3 is necessarily formed of non-conductive material.

In the present embodiment, the bridging portion 5 is configured to bridge the first electrode 21 or the second electrode 22, the reason for this is that, since the first electrode 21 and the second electrode 22 are provided intersecting with each other, the first electrode 21 or the second electrode 22 must be open at intersection position of the first electrode 21 and the second electrode 22 so that the first electrode 21 and the second electrode 22 are not switched on, in order to transmit the piezoelectric signal by the open first electrodes 21 or second electrodes 22, the open first electrodes 21 or second electrodes 22 are bridged by the bridging portion 5, so that the open first electrodes 21 or second electrodes 22 can transmit the piezoelectric signal. As shown in FIG. 4, the present embodiment takes the first electrode 21 being open as an example. It should be understood that, if the second electrode 22 is open, the bridging portion 5 similarly bridges the open second electrodes 22, which will not be described in detail herein.

In the present embodiment, the sensor 4 is connected to the bridging portion 5, wherein the thickness of the sensor 4 ranges from 0.01 µm to 0.1 µm, the reason for this is that, sensing function can be realized when the thickness of the sensor 4 is 0.01 µm, and the thicker the sensor 4 is, the better the sensing effect of the sensor 4 is, but the thicker the sensor 4 is, the higher the cost for manufacturing the touch substrate is, thus, in order to achieve a good sensing effect and save cost at the same time, the thickness of the sensor 4 preferably ranges from 0.01 µm to 0.1 µm. Of course, the thickness of the sensor 4 is not limited thereto, and may be varied in accordance with actual conditions, which will not be described in detail herein.

In the present embodiment, the area of the sensor 4 ranges from $10^2$ µm$^2$ to $100^2$ µm$^2$, the reason for this is that, since a human finger generally produces a touch point with a diameter larger than 5 mm, the area of the sensor 4 being too large may result in a low resolution of the sensor 4, sensitivity of the touch substrate may be lowered, however, if the area of the sensor 4 is too small, it is difficult to achieve a high precision in the process. Thus, the area of the sensor 4 preferably ranges from $10^2$ µm$^2$ to $100^2$ µm$^2$. Of course, the area of the sensor 4 is not limited thereto, and may be varied in accordance with actual conditions, which will not be described in detail herein.

In the present embodiment, the sensor 4 is formed of one of ZnO, SnO$_2$, In$_2$O$_3$, IZO, ZTO, IGO, IGZO, ZITO, AZTO, GZTO, HIZO, the reason for this is that, the process for manufacturing the sensor 4 using above materials is maturity, there is no need to add extra processes.

In the present embodiment, the sensor 4 has a sheet-like shape, the reason for this is that, only when the sensor 4 is formed in a sheet-like shape, when an external vertical pressure is applied on the sensor 4, one side surface of the sensor 4 is stretched and the other side surface of the sensor 4 is bent, due to piezoelectric effect, charges are separated, the two side surfaces of the sensor 4 form positive and negative poles respectively. Of course, the shape of the sensor 4 is not limited thereto, and may be varied in accordance with actual conditions, as long as the touch substrate can realize touch function by means of piezoelectric effect, which will not be described in detail herein.

Of course, a glass cover (not shown in the figures) is further provided above the sensor 4 to protect the touch substrate, and the transmittance of the touch substrate is not affected.

Specifically, when the sensor 4 is deformed by action of external force, a polarization phenomenon occurs therein, and simultaneously, positive and negative charges are respectively generated on two opposite surfaces thereof. When the external force disappears, the sensor 4 is restored to the state of non-charged. That is to say, when a user touches the surface of the touch substrate by a finger, the sensor 4 is subjected to a vertical pressure and is bent in a direction perpendicular to a horizontal direction, and due to piezoelectric effect, a piezoelectric signal is generated between the two opposite surfaces of the sensor 4, the piezoelectric signal is positioned by the first electrode 21 and the second electrode 22 intersected with each other, and a corresponding touch response is generated.

The sensor 4 is provided in the touch substrate of the present invention, when a touch occurs, a piezoelectric signal can be generated from the sensor 4 and is transmitted by the electrode layer 3 for the touch substrate sensing position of touch point, the position of the touch point is determined without need of coupling capacitance to be formed between the finger and the sensing electrode and the driving electrode, even if the finger of the user wears a glove or other insulation medium to touch the touch substrate, the position of the touch point still can be determined accurately.

Third Embodiment

Figure 5:
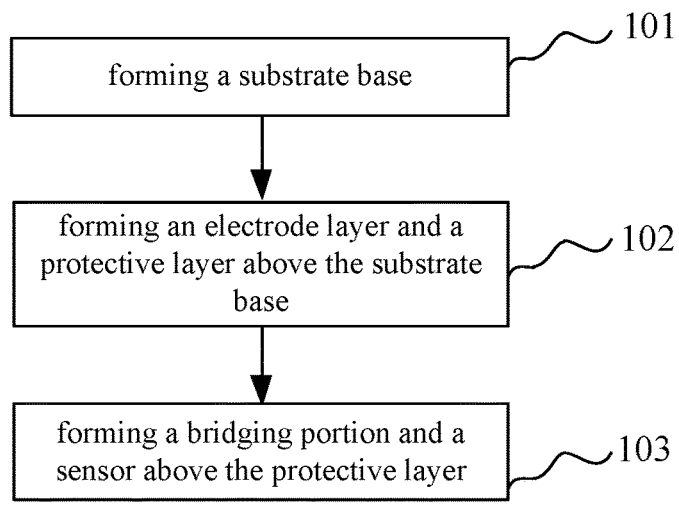
FIG. 5 shows a flow chart of a manufacturing method of a touch substrate in a third embodiment of the present invention.

Referring to FIG. 5, the present embodiment provides a manufacturing method of a touch substrate, and the touch substrate is the touch substrate of the first embodiment or the second embodiment, the manufacturing method comprising:

step 101, forming a base substrate 1;

step 102, forming an electrode layer 2 and a protective layer 3 above the base substrate 1; and step 103, forming a bridging portion 5 and a sensor 4 above the protective layer 3.

In the present embodiment, the electrode layer 2 comprises a plurality of first electrodes 21 and a plurality of second electrodes 22, the first electrode 21 and the second electrode 22 are provided intersecting with each other, the sensor 4 corresponds to intersection position of the first electrode 21 and the second electrode 22, and is connected to the first electrode 21 and the second electrode 22 respectively. The protective layer 3 is provided between the electrode layer 2 and the bridging portion 5 so that the electrode layer 2 and the bridging portion 5 are separated from each other, because both the electrode layer 2 and the bridging portion 5 are formed of conductive material. Of course, since the bridging portion 5 only corresponds to intersection position of the first electrode 21 and the second electrode 22, the protective layer 3 may be provided only corresponding to intersection position of the first electrode 21 and the second electrode 22. It is conceivable that, the protective layer 3 is necessarily formed of non-conductive material.

Of course, the manufacturing method further comprises a step of: forming a sensing chip connected to the electrode layer for the touch substrate sensing position of touch point. It should be understood that, the present embodiment is not limited thereto, and the position of the touch point may also be sensed by other structures in accordance with the piezoelectric signal, which will not be described in detail herein.

In the present embodiment, the bridging portion 5 is configured to bridge the first electrode 21 or the second electrode 22, the reason for this is that, since the first electrode 21 and the second electrode 22 are provided intersecting with each other, the first electrode 21 or the second electrode 22 must be open at intersection position of the first electrode 21 and the second electrode 22 so that the first electrode 21 and the second electrode 22 are not switched on, in order to transmit the piezoelectric signal by the open first electrodes 21 or second electrodes 22, the open first electrodes 21 or second electrodes 22 are bridged by the bridging portion 5, so that the open first electrodes 21 or second electrodes 22 can transmit the piezoelectric signal. The present embodiment takes the first electrode 21 being open as an example. It should be understood that, if the second electrode 22 is open, the bridging portion 5 similarly bridges the open second electrodes 22, which will not be described in detail herein.

In the present embodiment, the sensor 4 is connected to the bridging portion 5.

Of course, a glass cover (not shown in the figures) is further provided above the sensor 4 to protect the touch substrate, and the transmittance of the touch substrate is not affected.

The sensor 4 is provided in the touch substrate manufactured by the manufacturing method of touch substrate of the present embodiment, when a touch occurs, a piezoelectric signal can be generated from the sensor 4 and is transmitted by the electrode layer 3 for the touch substrate sensing position of touch point, the position of the touch point is determined without need of coupling capacitance to be formed between the finger and the sensing electrode and the driving electrode, even if the finger of the user wears a glove or other insulation medium to touch the touch substrate, the position of the touch point still can be determined accurately.

Fourth Embodiment

Figure 6:
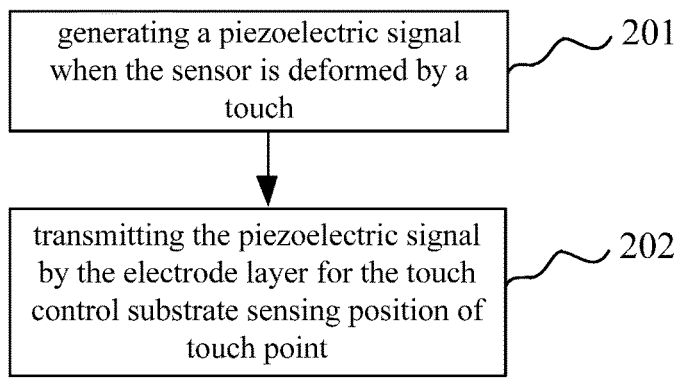
FIG. 6 shows a flow chart of a driving method of a touch substrate in a fourth embodiment of the present invention.

Referring to FIG. 6, the present embodiment provides a driving method of the touch substrate of the first embodiment or the second embodiment, the driving method comprises:

step 201, generating a piezoelectric signal when the sensor 4 is deformed by a touch; and step 202, transmitting the piezoelectric signal by the electrode layer 2 for the touch substrate sensing position of touch point.

In the present embodiment, the touch substrate further comprises a sensing chip connected to the electrode layer for the touch substrate sensing position of touch point.

Specifically, when the sensor 4 is deformed by action of external force, a polarization phenomenon occurs therein, and simultaneously, positive and negative charges are respectively generated on two opposite surfaces thereof. When the external force disappears, the sensor 4 is restored to the state of non-charged. That is to say, when a user touches the surface of the touch substrate by a finger, the sensor 4 is subjected to a vertical pressure and is bent in a direction perpendicular to a horizontal direction, and due to piezoelectric effect, a piezoelectric signal is generated between the two opposite surfaces of the sensor 4, the piezoelectric signal is positioned by the first electrode 21 and the second electrode 22 intersected with each other, and a corresponding touch response is generated.

The sensor 4 is provided in the touch substrate driven by the driving method of touch substrate of the present embodiment, when a touch occurs, a piezoelectric signal can be generated from the sensor 4 and is transmitted by the electrode layer 3 for the touch substrate sensing position of touch point, the position of the touch point is determined without need of coupling capacitance to be formed between the finger and the sensing electrode and the driving electrode, even if the finger of the user wears a glove or other insulation medium to touch the touch substrate, the position of the touch point still can be determined accurately.

Fifth Embodiment

The present embodiment provides a touch panel comprising an array substrate, a color filter substrate and the touch substrate of the first embodiment or the second embodiment.

The sensor 4 is provided in the touch substrate of the touch panel of the present embodiment, when a touch occurs, a piezoelectric signal can be generated from the sensor 4 and is transmitted by the electrode layer 3 for the touch substrate sensing position of touch point, the position of the touch point is determined without need of coupling capacitance to be formed between the finger and the sensing electrode and the driving electrode, even if the finger of the user wears a glove or other insulation medium to touch the touch substrate, the position of the touch point still can be determined accurately.

Sixth Embodiment

The present embodiment provides a touch device comprising the touch panel of the fifth embodiment.

The touch device may be any touch-sensitive product or member with display function, such as an electronic paper, a mobile phone, a tablet computer, a television, a display, a notebook computer, a digital photo frame, a navigator and the like.

The sensor 4 is provided in the touch substrate of the touch panel included in the touch device of the present embodiment, when a touch occurs, a piezoelectric signal can be generated from the sensor 4 and is transmitted by the electrode layer 3 for the touch substrate sensing position of touch point, the position of the touch point is determined without need of coupling capacitance to be formed between the finger and the sensing electrode and the driving electrode, even if the finger of the user wears a glove or other insulation medium to touch the touch substrate, the position of the touch point still can be determined accurately.

It could be understood that the above embodiments are merely exemplary embodiments adopted for describing the principle of the present invention, but the present invention is not limited thereto. Various variations and improvements may be made for those with ordinary skill in the art without departing from the spirit and essence of the present invention, and these variations and improvements shall also be encompassed within the protection scope of the present invention.

The invention claimed is:

1. A touch substrate, comprising: a base substrate, and an electrode layer, a bridging portion and a sensor provided above the base substrate, the electrode layer comprises a plurality of first electrodes and a plurality of second electrodes, the first electrodes and the second electrodes are provided intersecting with each other, the sensor corresponds to intersection position of the first electrodes and the second electrodes and is located at a side of each of the first electrodes and the second electrodes distal to one and the same base substrate such that the sensor is electrically connected to the first electrodes and the second electrodes, respectively, wherein the sensor is configured to generate a piezoelectric signal when a touch occurs, and the electrode layer is configured to transmit the piezoelectric signal so as to sense a position of a touch point by the touch substrate.

2. The touch substrate of claim 1, further comprising a sensing chip connected to the electrode layer so as to sense the position of the touch point by the touch substrate.

3. The touch substrate of claim 1, further comprising a protective layer provided between the electrode layer and the bridging portion.

4. The touch substrate of claim 1, wherein, the bridging portion is configured to bridge the first electrodes or the second electrodes.

5. The touch substrate of claim 1, wherein the sensor is connected to the bridging portion.

6. The touch substrate of claim 1, wherein the sensor has a thickness ranging from 0.01 μm to 0.1 μm.

7. The touch substrate of claim 1, wherein, the sensor has an area ranging from $10^2$ μm$^2$ to $100^2$ μm$^2$.

8. The touch substrate of claim 1, wherein, the sensor is formed of one of ZnO, SnO$_2$, In$_2$O$_3$, IZO, ZTO, IGO, IGZO, ZITO, AZTO, GZTO, HIZO.

9. The touch substrate of claim 1, wherein, the sensor has a sheet-like shape.

10. A manufacturing method of the touch substrate of claim 1, comprising steps of:
 forming a base substrate; and
 forming an electrode layer, a bridging portion and a sensor above the base substrate.

11. The manufacturing method of claim 10, further comprising a step of:
 forming a protective layer between the electrode layer and the bridging portion.

12. The manufacturing method of claim 10, wherein, the bridging portion is configured to bridge the first electrode or the second electrode.

13. The manufacturing method of claim 10, wherein, the sensor is connected to the bridging portion.

14. A driving method of the touch substrate of claim 1, comprising steps of:
 generating a piezoelectric signal when the sensor is deformed by a touch; and
 transmitting the piezoelectric signal by the electrode layer so as to sense the position of the touch point by the touch substrate.

15. A touch panel, comprising an array substrate, a color filter substrate and the touch substrate of claim 1.

16. A touch device, comprising the touch panel of claim 15.

17. The touch substrate of claim 1, wherein the sensor is provided close to the intersection position of the first electrodes and the second electrodes, and a projection of the sensor over the base substrate does not overlap with that of a portion of the first electrodes intersecting with the second electrodes.

* * * * *